United States Patent [19]

Baker et al.

[11] Patent Number: 4,847,795
[45] Date of Patent: Jul. 11, 1989

[54] SYSTEM FOR DIAGNOSING DEFECTS IN ELECTRONIC ASSEMBLIES

[75] Inventors: John R. Baker; Timothy T. Spencer, both of Tucson, Ariz.; Paul B. Cornia, Thornton, Colo.

[73] Assignee: Hughes Aircraft Company, Los Angeles, Calif.

[21] Appl. No.: 88,454

[22] Filed: Aug. 24, 1987

[51] Int. Cl.[4] ............................................. G01R 31/28
[52] U.S. Cl. ..................................... 364/579; 371/24; 371/25; 371/20; 324/73 AT
[58] Field of Search ................ 364/550, 551, 579, 513; 371/20, 25, 26; 324/73 R, 73 AT, 73 PC

[56] References Cited

U.S. PATENT DOCUMENTS

| | | | |
|---|---|---|---|
| 4,242,751 | 12/1980 | Henckels et al. | 371/26 |
| 4,622,647 | 11/1986 | Sagnard et al. | 371/20 |
| 4,648,044 | 3/1987 | Hardy et al. | 364/513 |
| 4,649,515 | 3/1987 | Thompson et al. | 364/900 |
| 4,709,366 | 11/1987 | Scott et al. | 371/20 |
| 4,713,815 | 12/1987 | Bryan et al. | 371/29 |

OTHER PUBLICATIONS

Hayes-Roth, "The Knowledge-Based Expert System: A Tutorial", 9/84, pp. 11–28, IEEE, Computer.

Primary Examiner—Parshotam S. Lall
Assistant Examiner—Thomas G. Black
Attorney, Agent, or Firm—Robert A. Hays; Michael W. Sales; A. W. Karambelas

[57] ABSTRACT

A system (20) for diagnosing defects in electronic assemblies is disclosed. The system (20) comprises a knowledge base (26) for storing information regarding the electronic assembly for receiving current test failure data regarding an electronic assembly (12). The system further comprises a pattern search section (36) for comparing current test failure data to information stored in the knowledge base (26). A voting section (40) is also provided for generating a recommended repair procedure to eliminate the defect in the electronic assembly (12). Finally, the system (20) further comprises a historical pattern generation section (46) which updates the knowledge base (26) with information regarding whether the recommended repair procedure eliminated the defect.

26 Claims, 2 Drawing Sheets

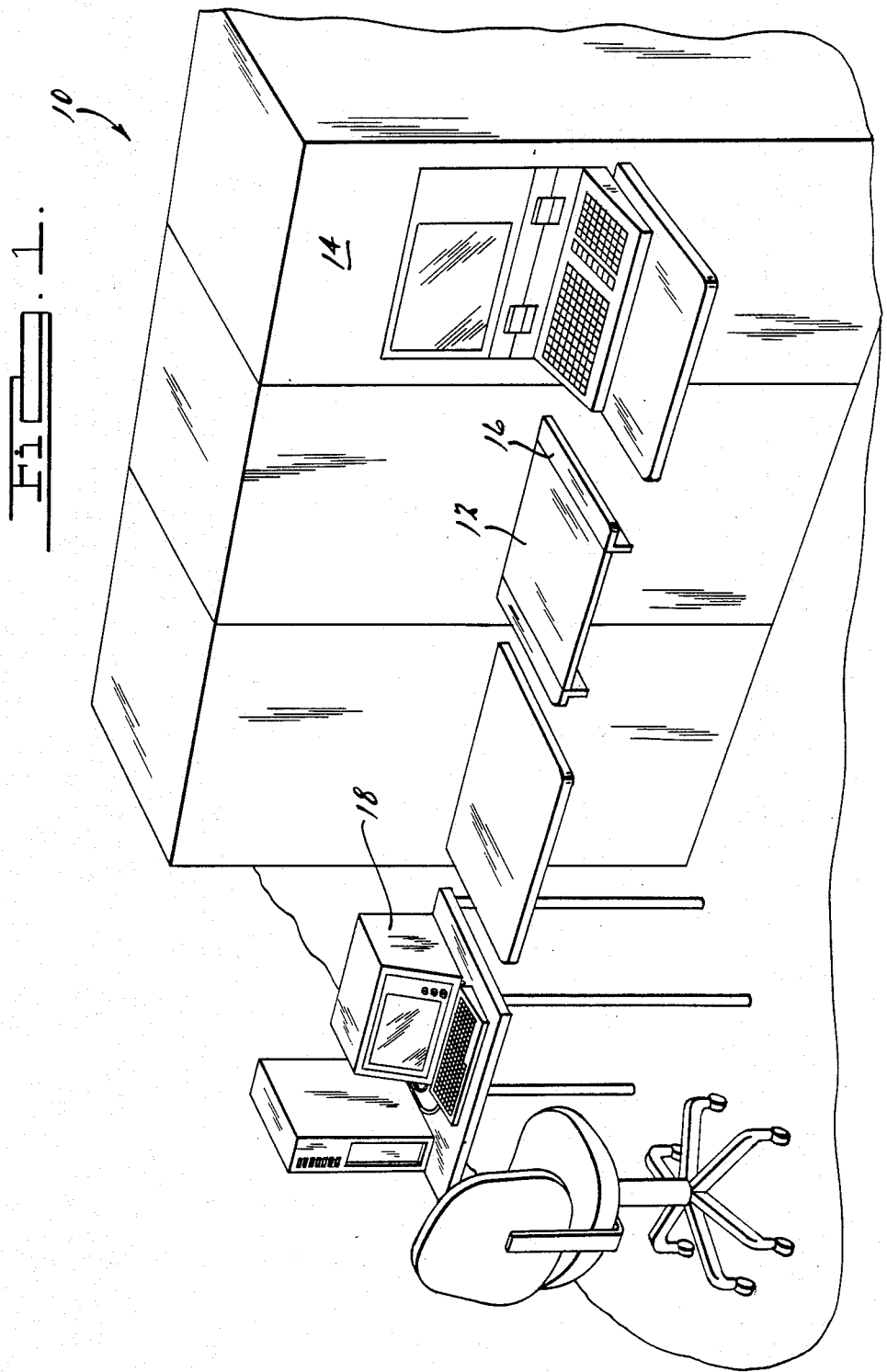

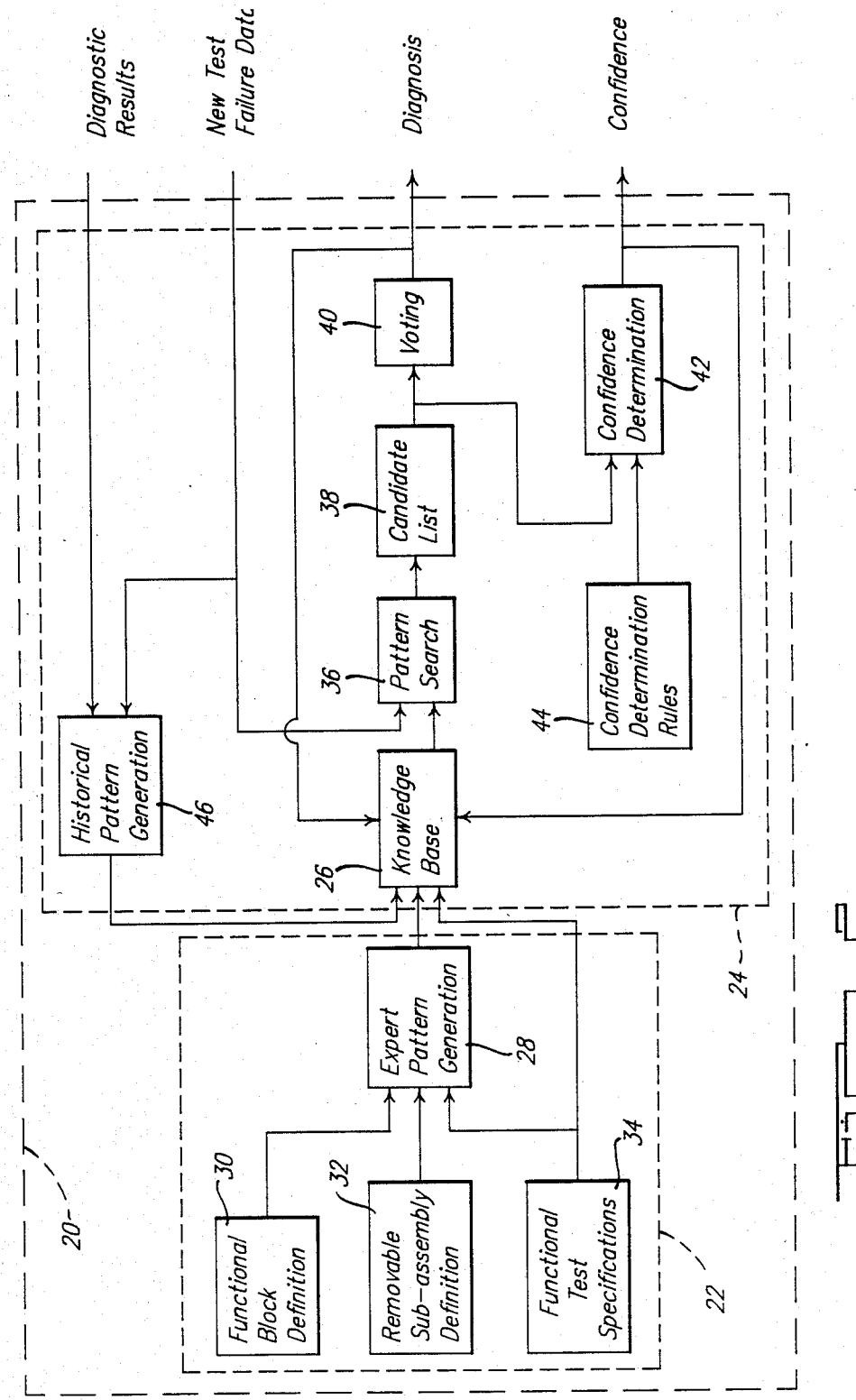

SYSTEM FOR DIAGNOSING DEFECTS IN ELECTRONIC ASSEMBLIES

BACKGROUND OF THE INVENTION

1. Field of the Invention

This invention relates to the assembly of electronic devices, and more particularly concerns the system for diagnosing defects in electronic assemblies.

2. Description of Related Art

Electronic assemblies often require a relatively large number of components to perform a given task. As the number of components used in such assemblies increases, the probability that the assembly contains at least one defect also increases for several reasons. First, though the probability that a particular component has a defect may be relatively low, the probability of having a defect in an assembly with a large number of components may be relatively high. In addition, components which originally had no defects may become defective during assembly due to the nature of the assembly process (e.g., such as by exposure to static electricity). Because of these factors, together with the high degree of reliability which must be achieved in certain types of electronic assemblies (e.g., assemblies used in missile guidance systems), it is often desirable to test each assembly prior to incorporation into the finished product. Such testing can be expensive in terms of cost and production time.

Computer assisted diagnosis of faulty electronic assemblies has been recognized as one way of minimizing these costs. Systems which perform computer assisted diagnosis included fault-tree programs and guided probe hardware and software. While these systems are generally effective under certain circumstances, they often have one or more of the following shortcomings:

- development is highly labor intensive
- use is highly labor intensive
- incapable of learning from prior misdiagnoses.
- relatively low success rates
- tend to be complex and difficult to understand
- often not suitable for the computer integrated manufacturing environment.

Another possible approach involving computer assisted diagnosis is the use of expert systems. Expert systems are characterized as computing systems which are capable of representing and reasoning about some knowledge-rich domain with a view to solving problems and giving advice. Such expert systems have been used in the diagnosis and treatment of blood disorders (i.e., MYCIN), the diagnosis of human disease (i.e., INTERNIST), and to assist geologists in "hard rock" mineral exploration (i.e., PROSPECTOR). Traditional expert systems are generally characterized as being rule-based in that the domain expert establishes a set of rules which causes the system to respond in a certain manner to a given input.

There are however several disadvantages of using conventional expert systems in diagnosing electronic assemblies. First, there may be no true domain expert available to permit knowledge acquisition, and it may be difficult to formulate the expertise into appropriate rules. In addition, the domain expert may not be able to provide sufficient knowledge to the system to achieve a high success rate. Further, the knowledge acquisition process is usually highly labor intensive, and must generally occur each time a new assembly type is to be diagnosed or when a product change occurs. Finally, the interaction with an expert system during diagnosis is generally highly labor intensive.

SUMMARY OF THE INVENTION

According to the preferred embodiment of the present invention, an apparatus for diagnosing a defect in electronic assemblies is disclosed. The apparatus comprises a knowledge base for storing information regarding the electronic assembly. The apparatus further comprises means for comparing current test failure data to information stored in the knowledge base which includes prior test failure data from other similar electronic assemblies. Means for generating a recommended repair procedure is also provided. Finally, the apparatus further comprises means for updating the knowledge base with information regarding whether the recommended repair procedure eliminated the defect.

BRIEF DESCRIPTION OF THE DRAWINGS

Various advantages of the present invention will become apparent to one skilled in the art upon reading the following specification and by reference to the following drawings in which:

FIG. 1 is a diagrammatic illustration of a test station having a computer using the system according to the preferred embodiment of the present invention; and FIG. 2 is a diagrammatic illustration of the system used by the computer shown in FIG. 1.

DESCRIPTION OF THE PREFERRED EMBODIMENTS

Referring to FIG. 1, a test station 10 is shown for testing of the operability of an electronic assembly 12. The electronic assembly 12 may be a portion of a missile guidance system, though it is to be understood that other types of electronic assemblies may also be tested. The test station 10 comprises a variety of test equipment generally designated by the numeral 14 which is connected to the electronic assembly 12 by means of a suitable connector 16. The test equipment 14 measures whether the analog outputs from the electronic assembly 12 are above or below certain limits, or whether the digital outputs from the electronic assembly 12 correspond to a particular pass vector. It is to be understood, however, that the test equipment 14 may be of any type which is suitable for performing tests on the electronic assembly 12.

To provide means for diagnosing defects in the electronic assembly 12, the test station 10 further comprises a computer 18. The computer 18 is used for generating a recommended repair procedure in response to test failure data provided by the test equipment 14. The test failure data may be directly provided by the test equipment 14 to the computer 18 by a suitable interface or manually supplied by the operator of the computer 18. In the preferred embodiment described below, the system which the computer 18 used to generate a recommended repair procedure has the following attributes. First, the system permits the computer 18 to use prior repair activity to determine the procedure which is most likely able to eliminate a particular defect. In addition, the system selects which of the successful repair procedures will be learned (i.e., used for subsequent diagnoses). Further, the system is able to determine the degree of confidence associated with a given diagnosis so that the user can evaluate the probability that implementing the recommended repair procedure will eliminate the defect. Finally, the system is able to determine whether two or more defects result in the same test failures. It is to be understood, however, that the system may include other attributes in addition to or in substitution of these attributes.

The system which the computer 18 uses to diagnose defects in electronic assemblies will be described both from a structural perspective and an operational perspective. As shown in FIG. 2, the structure of the system 20 used by the computer 18 comprises a modeling subsystem 22 and a data driven subsystem 24. The modeling subsystem 22 is used for providing information regarding the electronic assembly 12 to the data driven subsystem 24 concerning the various characteristics of the electronic assembly 12 upon which the diagnosis is to be performed. The data driven subsystem 24 is used for generating the diagnosis and the resulting level of confidence associated with that diagnosis. In addition, the data driven subsystem 24 is used for updating the information in the knowledge base 26 which is used for storing information regarding the electronic assembly 12 as described below.

To initially supply information to the knowledge base 26, the modeling subsystem 22 comprises an expert pattern generation section 28. The expert pattern generation section 28 is used to generate ready-patterns which are provided to the knowledge base 26. The ready-patterns generally include information on the expected cause of a particular test failure as described below. To generate ready-patterns, the expert pattern generation section 28 receives information from three additional sections of the modeling subsystem 22; the functional block definition section 30, the removable subassembly definition section 32, and the functional test specifications section 34.

In the functional block definition section 30, the domain expert is asked to divide the electronic assembly 12 into blocks by function. For example, the domain expert may divide the electronic assembly into blocks which perform digital filtering functions, logical operations, or signal amplification functions. In addition, the functional block definition section 30 also requests that the domain expert provide information concerning the relative dependence of the functional blocks with respect to each other. For example, the domain expert may note that the failure of functional block A will cause the output of functional block B to depart from the test specifications during testing.

In the removable subassembly definition section 32, the domain expert is asked to identify which removable subassemblies form each functional block. For example, the domain expert may be asked to identify the removable subassemblies which form a digital filter functional block. The removable subassemblies identified by the domain expert may be a single component or a collection of components depending on whether the individual components can be replaced when the recommended repair procedure is implemented.

The functional test specifications section 34 asks the domain expert to identify the name of each test as well as the test limits which are used to determine whether the electronic assembly 12 is defective. The test limits may be either the upper and lower limits of an analog signal, or a pass vector if the signal is digital. In addition, the functional test specification section 34 asks the domain expert to identify the functional block(s) to which each test is directed.

After the domain expert provides the information requested in the functional block definition section 30, the removable subassembly definition section 32, and the functional test specifications section 34, the expert pattern generation section 28 generates a series of ready-patterns. Each of the ready-patterns comprises a mapping of test failure information onto the removable subassembly and functional blocks which it is assumed will cause a particular test failure if that respective subassembly or block is defective. The ready-patterns are delivered to the knowledge base 26 in the data driven subsystem 24 which is used to store the ready-patterns generated in the modeling subsystem 22 as well as the ready-patterns generated during actual diagnosis.

It should be noted that the domain expert need not provide some or all of the information requested in the functional block definition section 30, the removable subassembly definition section 32 or the function test specification section 34. When some or all of this information is not provided by the domain expert, the knowledge base 26 will acquire the information inductively from actual test failure data. In addition, it should also be noted that the modeling subsystem 22 does not require that the domain expert identify those subassemblies which produce a particular test failure when defective with absolute correctness. Rather, the modeling subsystem 22 assumes that the failure of any removable subassembly in the functional block will cause the functional block to become defective. Because the modeling subsystem 22 weighs such assumptions against actual repair data acquired during operation, the assumptions which are erroneous will not influence the diagnosis once a sufficient number of electronic assemblies have been diagnosed.

To provide means for comparing the current test failure data to information stored in the knowledge base 26, the data driven subsystem 24 includes a pattern search section 36. The pattern search section 36 receives current test failure data and compares it to the ready-patterns stored in the knowledge base 26. The pattern search section 36 ranks the ready-patterns in terms of the degree of overlap with the current test failure data. Overlap is defined as the intersection of the current test failure data with a given ready-pattern divided by the union of current test failure data with the ready-pattern. For example, if the electronic assembly under diagnosis fails test 1, 3, 5 and 8, and the ready-pattern A failed tests 1, 2, 3 and 5, then the intersection would be (1, 3, 5) and the union would be (1, 2, 3, 5, 8). Because there are three tests in the intersection and five in the union, the overlap of this example would be 3/5 or 60%.

The ready-patterns and their associated overlap generated by the pattern search section 36 are used by the candidate list section 38 to order the ready-patterns according to the greatest degree of overlap. If two ready-patterns have the same degree of overlap, then the ready-patterns are ranked according to the parametric distance from the current test failure data. Parametric distance is the summation for all tests of the amount that an output exceeds its passing range divided by the breadth of the passing range. The following example best describes how the parametric distance may be calculated. Assume that an assembly passes test A if its output is between +10 volts and −10 volts, and therefore the breadth of passing range is 20 volts. Further assume that the assembly passes test B if its output is between +1 and −1 ohms, therefore the breadth of the passing range is 2 ohms. If the actual output from test A is 30 volts, the actual output exceeds the passing range by 20 volts. Accordingly, the amount that the output during test A exceeds its passing range (i.e., by 20 volts) divided by the breadth of the passing range (i.e., by 20 volts) results in the parametric distance of 1. Similarly, if the actual output from test B is 5 ohms, the actual output exceeds the passing range by 4 ohms. Accordingly, the amount that the output during test B exceeds the passing range (i.e., by 4 ohms) divided by the breadth of the passing range (i.e., 2 ohms) results in a parametric distance of 2. Therefore, the total parametric distance of the particular ready-pattern embodying these test results is 3.

Ready-patterns with the smallest parametric distance with respect to the current test failure data are given priority over those ready-patterns having equal overlap. The ordered list of ready-patterns is then stored in the global variable *BEST LIST* described below.

To provide means for generating a recommended repair procedure, the system 20 further includes a voting section 40. The voting section 40 first determines which ready-patterns in *BEST LIST* have at least 50% overlap with the ready-pattern having the highest degree of overlap with the current test failure data. These ready-patterns are then deemed to be qualified ready-patterns. The voting section 40 then examines the repair activity associated with each of the qualified ready-patterns to determine which subassembly and functional block were responsible for causing the particular electronic assembly to fail. The voting section 40 then counts the number of occurrences that each functional block of the qualified ready-patterns was identified as the source of the defect, and the functional block having the most occurrences is considered to be the source of the defect. Similarly, the voting section 40 also counts the number of occurrences that a particular subassembly was diagnosed as being the source of the defect, and the subassembly having the greatest number of occurrences is assumed to be defective. Accordingly, the system 20 produces two levels of diagnosis: the first level permits the diagnosis at the functional block level, and the second level permits diagnosis at the subassembly level.

To generate an output indicative of the degree of confidence associated with a recommended repair procedure, the system 20 includes a confidence determination section 42. The confidence determination section 42 is used to indicate a degree of confidence associated with a particular diagnosis at both the functional block level and the subassembly level. By generating information concerning the confidence of a particular diagnosis, the user can judge the degree to which the diagnosis is to be believed. The confidence determination section 42 produces a high confidence when the members of *BEST LIST* have a high overlap, and all members of *BEST LIST* indicate that the same functional block and subassembly is defective. The confidence determination section 42 also indicates whether two or more defects result in the same failure mode by determining whether there are many ready-patterns with perfect overlap yet there is not sufficient agreement between the ready-patterns on *BEST LIST* as to the source of the failure. When this occurs, an appropriate error message is placed in a particular file indicating that a "many-to-one" problem has occurred. The operator may then choose to include additional tests in the testing routine so as to eliminate the many-to-one problem.

The confident determination section 42 uses a series of rules located in the confidence determination rules section 44 to establish confidence. Such rules may be developed by the diagnostician familiar with the particular assembly and may based on one or more of the following factors:

(1) The degree of overlap between the ready-patterns highest on the *BEST LIST* with the current test failure data.
(2) The degree of agreement between the ready-patterns and the failure mode.

After the diagnosis is generated, the knowledge base 26 generates a wait-pattern which allows the knowledge base 26 to track diagnoses and retesting performed on the electronic assembly 12. A wait-pattern contains information similar to a ready-pattern but is not used in subsequent diagnoses until the wait-pattern is verified (i.e., when the assembly passes retesting). The system 20 then spawns a ready-pattern from the wait-pattern when the electronic assembly 12 finally passes testing. However, the system 20 will not spawn a ready-pattern under two circumstances. First, when an excessive number of subassemblies have had to be replaced to allow the electronic assembly to pass testing. Secondly, when the confidence associated with a wait-pattern is relatively high such that it can be assumed that a corresponding ready-pattern has already been learned. To allow the knowledge base 26 to generate wait-patterns, the knowledge base 26 receives information from the voting section 40 as well as the historical pattern generation section 46 which receives the diagnostic results and current test failure data. The historical pattern generation section 46 is used to update the knowledge base 26 with information regarding whether the recommended repair procedure eliminated the defect. The historical pattern generation section 46 generates ready-patterns from wait-patterns and is also used for calculating the RESULT objects described below.

While the system 20 used by the computer 18 was described from a structural perspective above, it is also useful to describe the system 20 operationally. To do this, reference will be made to certain variables having data structure shown at the table at the end of the specification. After the domain expert has supplied some or all the information requested by the modeling subsystem 22, the data driven subsystem 24 allows the user to enter the following commands:

FAIL—instructs the system to begin diagnosing a new failure. The FAIL command must be followed by the five pieces of information:
  part-type—a string representing the name of the type of assembly to be diagnosed (e.g., "beacon").
  assembly-name—a string representing the name of the particular assembly to be diagnosed which can be related to the serial number of the part (i.e., "SN48"). The system will construct a unique name from the part-type and assembly-name.
  date—the date on which the test failures occurred.
  failed-name-list—a list of the names of the tests which the assembly failed.
  failed-param-list—a list of the values by which the assembly failed the particular test, with scalar test parameters being a single value and non-scalar parameters being a list of values.

REWORK—informs the system that some rework has been done on the assembly under test. This command is followed by three pieces of information:
- part-type—the string representing the name of the type of assembly under test as defined above.
- assembly-name—the string representing the name of the particular assembly to be diagnosed as defined above.
- rework-action—a string representing what was done to repair the assembly. This may be a circuit symbol ("U3") or some other short string. These strings will be used to match other strings, so it is essential that they be chosen uniformly (i.e., "U3-3" will not match "U3-pin3" even though these refer to the same item). Since only one string is allowed per REWORK command, if two rework actions were performed, two REWORK commands should be issued.

PASS—informs the system 20 that the electronic assembly has successfully passed retest after having been reworked. PASS commands are always followed by part-type and assembly-name as defined above.

SCRAP—informs the system 20 that an assembly has been scrapped so that the system 20 can delete any wait-patterns which are awaiting retest of that particular assembly. SCRAP commands are always followed by part-type and assembly-name.

SCRATCH—deletes all objects and PATTERNs from memory.

COMMIT—saves objects onto disk files.

QUIT—returns control to the interpreter.

When a FAIL command is received, the system 20 determines whether the part type is known by comparing the *PART NAME* variable to the global variable *ASSEMBLY-LIST*. The *ASSEMBLY-LIST* contains the names of all the part types that the system 20 is able to diagnose. If the part type is not known by the system 20, then the system 20 obtains all the diagnostic objects (e.g., ready-patterns, wait-patterns, test definitions, subassemblies, blocks, previous diagnosis, previous results, etc.) either from the host or from a local disk. The names of all the diagnostic objects for a given assembly type are included in the ASSEMBLY-DEF object. Accordingly, each ASSEMBLY-DEF is composed of a list of ready-patterns, wait-patterns, results, subassemblies, blocks, tests and prediction objects which define the assembly type or which were generated when making diagnoses for the assembly type.

Once the system 20 verifies that the objects for the electronic assembly 12 exist in the system 20, the system 20 reads the failure date into the global variable *DATE*, the failed test names into the global variable *CASE-NAME-LIST*, and the failure parameters into the global variable *CASE-PARAM-LIST*. The system then generates a :HANDLE-FAILURE message to the proper ASSEMBLY-DEF.

When the ASSEMBLY-DEF receives the :HANDLE-FAILURE message, the system 20 determines whether the serial number or name of the particular electronic assembly is already known and is ready for retest (i.e., determines whether *PATTERN-NAME* is on WAIT-PATTERN-LIST). If it is, the system sends the WAIT-PATTERN a :DO-OBJECT-UPDATE-FOR-FAIL message described below. If there is no pattern waiting for retest having the particular part name, then it is a first-time failure and is diagnosed by the ASSEMBLY-DEF sending a :DO-A-DIAGNOSIS message to itself.

When the ASSEMBLY-DEF receives the :DO-A-DIAGNOSIS, the system 20 first checks to ensure that the *PATTERN-NAME* is unique and then sends itself a :GENERATE-BEST-LIST message. When the ASSEMBLY-DEF receives the :GENERATE-BEST-LIST, the system 20 loops through all the PATTERNs on its READY-PATTERN-LISt and sends each of them a :CHECK-BEST-LIST-FOR-INCLUSION message.

As each PATTERN receives the :CHECK-BEST-LIST-FOR-INCLUSION message, the system 20 determines whether or not the PATTERN should be placed on global *BEST-LIST*. As discussed above, *BEST-LIST* is a list of PATTERNs which are most like the failure which is being diagnosed. The system 20 then determines whether each PATTERN is more like the current failure than one or more of the PATTERNs which have already been placed on *BEST-LIST*. If a given PATTERN is more like the current failure than the patterns on *BEST LIST*, the system 20 removes one of the prior members of *BEST LIST*. While the maximum length of *BEST-LIST* is 4 members, it is to be understood that other lengths may be chosen.

After all PATTERNs have been considered for placement on *BEST-LIST*, the ASSEMBLY-DEF sends itself a :CREATE-WAIT-PATTERN message so that it will create a WAIT-PATTERN object and a PREDICTION object and add them to the appropriate lists within the ASSEMBLY-DEF. In addition, while the system 20 is creating a WAIT-PATTERN, the diagnosis and the related confidence is generated based on the characteristics of the ready-pattern in *BEST LIST*. While the diagnosis is complete, the diagnosis is not yet validated (i.e., the WAIT-PATTERN has not spawned a PATTERN).

A diagnosis may be validated after the failed assembly has been reworked and undergoes a retest to determine whether the rework eliminated the defect. During this process, the system 20 will receive one or more REWORK commands which will be routed to the appropriate WAIT-PATTERN. The WAIt-PATTERN adds the rework actions to its ACTUAL-REWORK and LOGICAL-REWORK lists as they are received. When the retest finally occurs, the electronic assembly will either pass or fail.

When an ASSEMBLY-DEF receives :HANDLE-FAILURE message for a part name which is on its WAIT-PATTERN-LIST, the system 20 assumes that a retest occurred and that the retest failed. The ASSEMBLY-DEF then sends the appropriate WAIT-PATTERN a :DO-OBJECT-UPDATE-FOR-FAIL message. The WAIT-PATTERN receiving this message determines whether it recorded any rework since the last time the assembly was tested. If the WAIT-PATTERN did not record any rework, the operation is aborted causing the ASSEMBLY-DEF to remove the WAIT-PATTERN and treat the failure as though it were a first time failure.

If the WAIT-PATTERN receiving the :DO-OBJECT-UPDATE-FOR-FAIL message finds that some rework was done since the last time the assembly was tested, then it causes a re-diagnosis to be performed by sending the ASSEMBLY-DEF a :GENERATE-BEST-LIST message. The WAIT-PATTERN then sends itself a :CHECK-NEW-CASE-FOR-SAME-DIAGNOSIS message to see if the new diagnosis was the same or was contained in the old diagnosis. If the new diagnosis is the same as the old diagnosis, then the rework is deemed worthless and is therefore removed from the LOGICAL-REWORK list (but retained in the ACTUAL-REWORK list) of the WAIT-PATTERN, and no new diagnosis is issued.

If the new diagnosis is different, then a new diagnosis is issued by sending the ASSEMBLY-DEF a :CREATE-WAIT-PATTERN message. In this case, the old diagnosis is not deleted and the original WAIT-PATTERN is preserved. The rationale for doing so is based on the assumption that the rework had a positive impact since it changed the behavior of the assembly and therefore the original diagnosis had some degree of validity. The new diagnosis results in the creation of a new WAIT-PATTERN which is placed on the WAIT-PATTERN-LIST of the ASSEMBLY-DEF and on the SECONDARY-PATTERN-LIST of the original WAIT-PATTERN. Accordingly, as more information concerning the assembly becomes available, all of the relevant WAIT-PATTERNs are linked by virtue of the SECONDARY-PATTERN-LIST of the original WAIT-PATTERN.

When the system receives a PASS command, the system determines whether the appropriate ASSEMBLY-DEF exists, and builds the ASSEMBLY-DEF if it does not. Then the system sends the ASSEMBLY-DEF a :WAIT-LIST-CHECK message to see if the assembly that passed was on the WAIT-PATTERN-LIST of the ASSEMBLY-DEF. If the assembly is waiting for validation, the system 20 generates a :DO-OBJECT-UPDATE-FOR-PASS message.

When the WAIT-PATTERN receives the :DO-OBJECT-UPDATE-FOR-PASS message, the system 20 first sends the same message to any WAIT-PATTERNs on its SECONDARY-PATTERN-LIST so that they all update together. To determine whether the WAIT-PATTERN should create a new PATTERN, the system determines whether the subassembly diagnosis was correct or incorrect. If the subassembly diagnosis was included in LOGICAL-REWORK, then the diagnosis was correct. If the diagnosis was correct, then a new pattern is created (i.e., the system learns) unless so much rework was done that the new pattern is of questionable value. If the diagnosis was correct and confidence was high, no new pattern is created because the system 20 assumes that this failure mode has been learned and any more patterns of this type would be of no practical value. Each WAIT-PATTERN creates a RESULT object so that the results of this diagnostic cycle can be examined and reported upon. The new PATTERN and RESULT objects created this way are added to the appropriate lists of the ASSEMBLY-DEF, and the WAIT-PATTERN and any secondaries are all removed from the WAIT-PATTERN-LIST of the ASSEMBLY-DEF.

It should be understood that the present invention was described in connection with one specific embodiment. Other modifications will become apparent to one skilled in the art upon a study of the specification, drawings and the following claims.

LISTING OF DATA STRUCTURES

*ASSEMBLY-LIST*→ (list of ASSEMBLY-DEFs)
ASSEMBLY-DEF → name
→ (list of PATTERNs)
→ (list of WAIT-PATTERNs)
→ (list of RESULTs)
→ (list of COMPONENTs)
→ (list of BLOCKs)

-continued
LISTING OF DATA STRUCTURES

→ (list of TEST-DEFs) (test definitions)
→ (list of outstanding PREDICTIONs)
PATTERN → name
→ (list of TEST-DEF names of tests that failed)
→ (list of associated parameters or vectors of failed tests)
→ (list of "fixes" that corrected the problem)
→ date of test
→ true or false (was pattern created by expert or real test?
→ number of times pattern used in diagnoses and correct
→ number of times pattern used in diagnoses and incorrect
→ temporary storage to calculate overlap
→ temporary storage to calculate distance
WAIT-PATTERN → (list of TEST-DEF names of failed tests)
→ (list of associated parameters and vectors)
→ date of test
→ wait status
→ (list of secondary WAIT-PATTERNs)
→ (list of PATTERNs who contributed to diagnosis)
→ (list of overlaps of contributors)
→ (list of lists of "fixes" of contributors)
→ number of perfect (100% overlap) matches during diagnosis
→ list of all rework done to assembly)
→ (list of all rework minus that which probably didn't need to be done)
RESULT → date of test
→ (list of overlaps of contributors)
→ (list of lists of "fixes" of contributors)
→ number of perfect matches during diagnosis
→ (list of all rework done to assembly)
→ (list of all rework minus useless rework)
COMPONENT → (list of circuit BLOCKs the subassembly is a member of)
BLOCK → (list of COMPONENTs in the circuit BLOCK)
TEST-DEF → name of test?
→ true or false, is it a scalar (analog) or digital test
→ high-limit (if analog) or vector (if digital)
→ low-limit (if analog) (false if digital)
→ limit-delta (difference between high and low)
PREDICTION → date of test
→ name of BLOCK where problem is suspected to be
→ (list of COMPONENTs in that BLOCK)
→ confidence that problem is in the BLOCK
→ name of COMPONENT suspected to be the problem
→ confidence that COMPONENT is the problem
→ retest message (if any)
→ many-to-one message (if any)

What is claimed is:

1. An apparatus for diagnosing a defect in an electronic assmbly in response to current test failure data, said electronic assembly being divided into functional blocks and comprising a plurality of replaceable subassemblies, said apparatus comprising:
a knowledge base for storing information regarding said electronic assembly, said information comprising prior test failure data from other assemblies similar to said electronic assembly;
means for comparing said current test failure data to information stored in said knowledge base;
means for generating a recommended repair procedure to eliminate said defect in said electronic assembly, said knowledge base generating a wait-pattern containing said recommended repair procedure; and means for updating said knowledge base with information regarding whether said recommended repair procedure eliminated said defect, said means for updating said knowledge base generating a ready-pattern from said wait-pattern only when said recommended repair procedure eliminates said defect.

2. The apparatus of claim 1, further comprising means for providing information regarding said electronic assembly to said knowledge base from a domain expert.

3. The apparatus of claim 1, further comprising means for generating an output indicative of the degree of confidence associated with said recommended repair procedure, said output being indicative of the probability that implementing said recommended repair procedure will eliminate said defect.

4. The apparatus of claim 1, wherein said knowledge base includes information from a domain expert concerning the functional blocks which comprise said electronic assembly.

5. The apparatus of claim 4, wherein said knowledge base includes information from a domain expert concerning the dependence of said functional blocks with respect to each other.

6. The apparatus of claim 5, wherein said knowledge base includes information from a domain expert concerning the identification of the replaceable subassemblies in each of said functional blocks.

7. The apparatus of claim 1, wherein said knowledge base includes a plurality of ready-patterns, each of said ready-patterns comprising a record of the repair activity undertaken to eliminate a defect in another assembly similar to said electronic assembly.

8. The apparatus of claim 1, wherein said means for comparing said current test failure data to the information stored in said knowledge base determines the overlap of said current test failure data with said prior test failure data.

9. The apparatus of claim 8, wherein said means for comparing said current test failure data to said information stored in said knowledge base compares said current test failure data with prior test failure data having the greatest overlap with said current test failure data.

10. A method for diagnosing a defect in an electronic assembly, said electronic assembly able to be divided into functional blocks and comprising a plurality of replaceable subassemblies, said method comprising the steps of:
(a) providing information regarding said electronic assembly from a domain expert to a knowledge base;
(b) testing said electronic assembly to generate current test failure data;
(c) comparing said current test failure data to information stored in said knowledge base, said information stored in said knowledge base comprising prior test failure data from other assemblies similar to said electronic assembly;
(d) generating a recommended repair procedure to eliminate said defect in said electronic assembly and a wait-pattern containing said recommended repair procedure;
(e) determining whether said recommended repair procedure eliminated said defect in said electronic assembly;
(f) repeating steps (b) through (e) until said defect has been eliminated; and
(g) storing said recommended repair procedures in said knowledge base, said step of storing said recommended repair procedures includes generating a ready-pattern from each of said wait-patterns only when a recommended repair procedure eliminates said defect.

11. The method of claim 10, comprising the additional step of generating an output indicative of the degree of confidence associated with each recommended repair procedure, said output being indicative of the probability that implementing a recommended repair procedure will eliminate said defect.

12. The method of claim 10, wherein said step of providing information from a domain expert comprises the step of providing said knowledge base with information concerning the functional blocks which comprise said electronic assembly.

13. The method of claim 12, wherein said step of providing information from a domain expert comprises the step of providing information to said knowledge base concerning the dependence of said functional blocks with respect to each other.

14. The method of claim 13, wherein said step of providing information from a domain expert comprises the step of providing information to said knowledge base concerning the identification of the replaceable subassemblies in each of said functional blocks.

15. The method of claim 10, wherein said knowledge base includes a plurality of ready-patterns, each of said ready-patterns comprising a record of the repair activity undertaken to eliminate a defect in another assembly similar to said electronic assembly.

16. The method of claim 10, wherein said step of comparing said current test failure data to the information stored in said knowledge base comprises the step of determining the overlap of said current test failure data with said prior test failure data.

17. The method of claim 16, wherein said step of comparing said current test failure data to said information stored in said knowledge base comprises the step of comparing said current test failure data with prior test failure data having the greatest overlap with said current test failure data.

18. A machine implementable method for diagnosing defects in an electronic assembly comprising:
providing information regarding said assembly to a knowledge base from a domain expert;
generating a recommended repair procedure in response to current test failure data from said electronic assembly, said knowledge base generating a wait-pattern containing said recommended repair procedure; and
learning said recommended repair procedure when said recommended repair procedure eliminates said defect, said learning step includes generating a ready-pattern from said wait-pattern only when said recommended repair procedure eliminates said defect.

19. The method of claim 18, comprising the additional step of generating an output indicative of the degree of confidence associated with said recommended repair procedure, said output being indicative of the probability that implementing said recommended repair procedure will eliminate said defect.

20. The method of claim 19, wherein said knowledge base includes information from a domain expert concerning the functional blocks which comprise said electronic assembly.

21. The method of claim 20, wherein said knowledge base includes information from a domain expert concerning the dependence of said functional blocks with respect to each other.

22. The method of claim 21, wherein said knowledge base includes information from a domain expert concerning the identification of the replaceable subassemblies in each of said functional blocks.

23. The method of claim 22, wherein said knowledge base includes a plurality of ready-patterns, each of said ready-patterns comprising a record of the repair activity undertaken to eliminate a defect in another assembly similar to said electronic assembly.

24. The method of claim 23, wherein said step of generating a recommended repair procedure comprises the step of determining the overlap of said current test failure data with the ready-patterns stored in said knowledge base.

25. The method of claim 24, wherein said step of generating a recommended repair procedure comprises the step of comparing said current test failure data with the ready-patterns stored in said knowledge base having the greatest degree of overlap with said current test failure data.

26. A system for diagnosing defects in an electronic assembly from current test failure data comprising:
   a modeling subsystem for use in obtaining information regarding said electronic assembly from a domain expert and generating a plurality of ready-patterns in response thereto, said modeling subsystem comprising:
   (a) a functional block definition for allowing said domain expert to provide information regarding the functional blocks of said electronic assembly,
   (b) a removable subassembly definition section for allowing said domain expert to provide information regarding the removable subassemblies in each of said functional blocks,
   (c) a functional test specification section for allowing said domain expert to provide information regarding the test limits which are to be used for determining whether said electronic assembly has a defect,
   (d) an expert pattern generation section for allowing said plurality of ready-patterns from the information provided by said domain expert through said functional test definition section, said removable subassembly definition section, and said functional test specification section; and
a data driven subsystem for generating a diagnosis comprising:
   (a) a knowledge base for storing said plurality of patterns and generating a wait-pattern upon receipt of said current test failure data,
   (b) a pattern search section for ranking the ready-patterns in said knowledge base with said current test failure data in terms of overlap,
   (c) a candidate list section for forming a list of ready-patterns having the greatest degree of overlap with the current test failure data,
   (d) a voting section for voting on the recommended repair procedure suggested by said ready-patterns in said list,
   (e) a confidence determination section for indicating the degree of confidence associated with said recommended repair procedure according to a set of rules,
   (f) a confidence determination rule section containing said set of rules used by said confidence determination section to indicate the degree of confidence associated with said recommended repair procedure, and
   (g) a historical pattern generation section for generating a ready-pattern from said wait-pattern.

* * * * *